US011843508B2

(12) United States Patent
Sridhar et al.

(10) Patent No.: US 11,843,508 B2
(45) Date of Patent: Dec. 12, 2023

(54) METHODS AND APPARATUS TO CONFIGURE VIRTUAL AND PHYSICAL NETWORKS FOR HOSTS IN A PHYSICAL RACK

(71) Applicant: VMWARE, INC., Palo Alto, CA (US)

(72) Inventors: Thayumanavan Sridhar, Palo Alto, CA (US); Raja Kommula, Palo Alto, CA (US); Santoshkumar Babalad, Bangalore (IN); Rajendra Gutupalli, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 66 days.

(21) Appl. No.: 17/194,453

(22) Filed: Mar. 8, 2021

(65) Prior Publication Data

US 2021/0194769 A1    Jun. 24, 2021

Related U.S. Application Data

(63) Continuation of application No. 16/122,908, filed on Sep. 6, 2018, now Pat. No. 10,944,633.

(30) Foreign Application Priority Data

Jun. 15, 2018 (IN) .............................. 201841022463

(51) Int. Cl.
*H04L 41/12* (2022.01)
*H04L 45/02* (2022.01)
(Continued)

(52) U.S. Cl.
CPC ...... *H04L 41/0886* (2013.01); *H04L 41/0803* (2013.01); *H04L 41/12* (2013.01);
(Continued)

(58) Field of Classification Search
CPC . H04L 41/0886; H04L 41/0803; H04L 41/12; H04L 45/02; H04L 49/40; H04L 49/70
(Continued)

(56) References Cited

U.S. PATENT DOCUMENTS

| 8,908,709 | B1 | 12/2014 | Aybay |
| 10,944,633 | B2 | 3/2021 | Sridhar et al. |

(Continued)

OTHER PUBLICATIONS

United States Patent and Trademark Office, "Non-Final Office Action," dated Jan. 10, 2020 in connection with U.S. Appl. No. 16/122,908, 17 pages.

(Continued)

*Primary Examiner* — Meng Vang
(74) *Attorney, Agent, or Firm* — Hanley, Flight & Zimmerman, LLC

(57) ABSTRACT

A disclosed example includes configuring a virtual network and a physical network for at least twenty-four hosts and a top-of-rack switch in less than one minute by: generating, by executing an instruction with one or more processors, network topologies of the hosts based on physical network connection information indicative of physical network connections between the hosts and the top-of-rack switch; determining, by executing an instruction with the one or more processors, whether implementing the network topologies of the hosts concurrently is valid based on an evaluation of the network topologies relative to a network topology validation rule; and configuring, by executing an instruction with the one or more processors, the top-of-rack switch based on one or more of the network topologies.

27 Claims, 9 Drawing Sheets

(51) Int. Cl.
  *H04L 41/08*    (2022.01)
  *H04L 49/00*    (2022.01)
  *H04L 49/40*    (2022.01)
  *H04L 41/0803*  (2022.01)

(52) U.S. Cl.
  CPC .............. *H04L 45/02* (2013.01); *H04L 49/40* (2013.01); *H04L 49/70* (2013.01)

(58) Field of Classification Search
  USPC ........................................................ 709/220
  See application file for complete search history.

(56) References Cited

U.S. PATENT DOCUMENTS

| | | | | |
|---|---|---|---|---|
| 2004/0230873 | A1* | 11/2004 | Ward | H04L 41/12 714/39 |
| 2011/0292787 | A1* | 12/2011 | Kotrla | H04L 12/14 370/216 |
| 2013/0108263 | A1 | 5/2013 | Srinivas et al. | |
| 2013/0121157 | A1* | 5/2013 | Logvinov | H04W 40/10 370/238 |
| 2014/0101467 | A1 | 4/2014 | Jubran et al. | |
| 2014/0304401 | A1* | 10/2014 | Jagadish | H04L 41/12 709/224 |
| 2015/0163100 | A1* | 6/2015 | Graf | H04L 45/245 370/255 |
| 2016/0179567 | A1 | 6/2016 | Ding et al. | |
| 2016/0344652 | A1* | 11/2016 | Ashwood-Smith | H04L 41/12 |
| 2017/0180210 | A1 | 6/2017 | Lisouski et al. | |
| 2018/0026812 | A1 | 1/2018 | Verkaik et al. | |
| 2018/0359171 | A1* | 12/2018 | Kommula | H04L 45/02 |

OTHER PUBLICATIONS

United States Patent and Trademark Office, "Final Office Action," dated Jul. 22, 2020 in connection with U.S. Appl. No. 16/122,908, 15 pages.

United States Patent and Trademark Office, "Notice of Allowance," dated Oct. 28, 2020 in connection with U.S. Appl. No. 16/122,908, 9 pages.

* cited by examiner

```
hosts = {set of hosts in the network}                    802
compatible_sets = { (1, 6), (2, 7), (3, 8), (4, 9), (5, 10) }
prev_set_id = INVALID
foreach Hᵢ in hosts
    tid = host_topology (Hᵢ)
    if (prev_tid != INVALID)
        if prev_tid != tid AND
            set (tid, prev_tid) is not present in compatible_sets
                return INVALID_TOPOLOGY
        endif
    endif
    prev_tid = tid
endfor return VALID_TOPOLOGY
```

⟵ 800

VALIDATION

FIG. 8

```
hosts = {set of hosts in the network}
foreach Hᵢ in hosts
    foreach NIC bundle Bᵢ in Hᵢ
        if Bᵢ is a LAG
902         ⎧ create a dvport in VDS with all NICs in Bᵢ
            ⎨ configure portgroup properties with LAG
            ⎩ configure LAG on TOR ports connected to Hᵢ
        elseif
904         ⎧ create a dvport in VDS with NIC in Bᵢ
            ⎨ configure portgroup
            ⎩ Enable TOR port connected to Hᵢ
        endif
    endfor
endfor return VALID_TOPOLOGY
```

⟵ 900

CONFIGURATION

FIG. 9

METHODS AND APPARATUS TO CONFIGURE VIRTUAL AND PHYSICAL NETWORKS FOR HOSTS IN A PHYSICAL RACK

RELATED APPLICATION

This patent arises from a continuation of U.S. patent application Ser. No. 16/122,908, filed on Sep. 6, 2018, and entitled "METHODS AND APPARATUS TO CONFIGURE VIRTUAL AND PHYSICAL NETWORKS FOR HOSTS IN A PHYSICAL RACK," which claims priority to IN Patent Application No. 201841022463, filed Jun. 15, 2018. U.S. patent application Ser. No. 16/122,908 and IN Patent Application No. 201841022463 are hereby incorporated herein by reference in their entireties. Priority to U.S. patent application Ser. No. 16/122,908 and IN Patent Application No. 201841022463 is claimed.

FIELD OF THE DISCLOSURE

The present disclosure relates generally to network-based computing and, more particularly, to methods and apparatus to configure physical and virtual networks for hosts in a physical rack.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 8 is example pseudocode representative of example machine-readable instructions that may be executed to implement the VIA of FIG. 2 to validate network topologies of the physical server hosts of the physical rack of FIG. 2.

FIG. 9 is example pseudocode representative of example machine-readable instructions that may be executed to implement the VIA of FIG. 2 to configure physical and virtual networks for the physical server hosts of the physical rack of FIG. 2.

Figure 1:
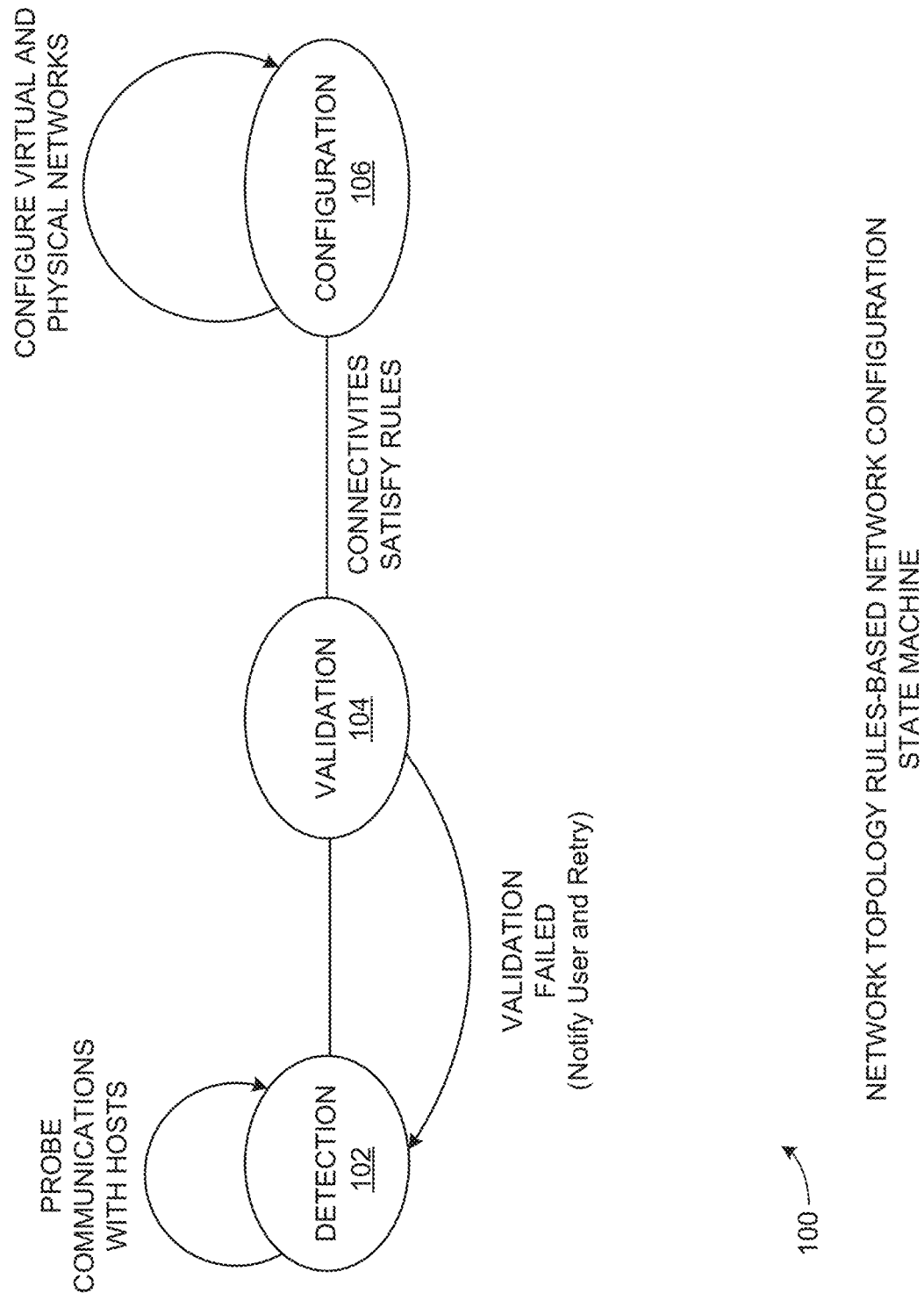
FIG. 1 is an example rules-based network configuration state machine representative of computer readable instructions that may be executed to implement an example virtual imaging appliance (VIA) of FIG. 2 to configure virtual and physical networks for physical server hosts of a physical rack of FIG. 2.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Modern datacenters are equipped with physical racks in which multiple physical server hosts are installed. A physical server host ("host") typically includes up to four 10/25 gigabit-per-second (Gbps) physical network interface cards (pNICs) for high-availability purposes. These NICs are typically connected to one or more switches called Top-of-Rack (TOR) switches of corresponding physical rack. Depending on the type of network architecture implemented, an administrator may decide to group the NICs as a Link Aggregation Group (LAG) using a link aggregation control protocol (LACP) or leave the NICs for use as individual links. Such different connectivity options provide various ways for a host to reach a datacenter network from the physical rack. To enable the hosts in a physical rack to communicate with a network via the ToR switches, virtual networks (e.g., in hypervisors on the hosts) and physical networks (e.g., the ToR switches) must be properly configured based on the physical connections between the hosts and the ToR switches.

In prior techniques, to enable configuring the virtual networks and physical networks, an administrator manually analyzes physical connections between hosts and ToR switches, and manually enters physical network connection information into a network configuration tool. The network configuration tool then configures virtual network settings in the hosts and physical network settings in the ToR switches without validating or confirming that the user-entered physical network connection information represents valid combinations of network topologies that can be configured to operate concurrently in a physical rack. Also, in such prior techniques, the network configuration tool expects that every host of a physical rack be connected to a network using the same physical network topology. As such, an administrator must ensure that physical network connections between all of the hosts of a physical rack and ToR switches are of the same physical network topology. There are a number of disadvantages with such prior techniques of administrators manually providing physical network connection information for a physical rack. Physical racks can include upwards of 24 hosts per physical rack or more. This makes the prior techniques a lengthy, time-consuming process. For example, using such prior techniques, configuring virtual and physical networks for a 24-host rack typically requires over eight hours for manually analyzing network connections, manually re-wiring connections between hosts and ToR switches to use the same physical network topology between hosts and switches, manually entering network connections into the network configuration tool, and performing virtual and physical network configurations based on the user-entered network connection information. In addition, because of the number of different possible physical network connection possibilities, the manual inspection process of physical network connections is prone to error. This, in turn, leads to erroneous network configurations because the prior network configuration tool does not validate or confirm that the user-entered physical network connection information represents network topologies that can be validly used concurrently in a physical rack. In addition, some rack configurations may have hosts that differ from one another in the number of pNICs installed therein. For example, some hosts may have two pNICs, while other hosts are provided with four pNICs. However, because the network configuration tool expects that all hosts use the same type of physical network topology, if there is at least one host with two pNICs, all hosts are limited to using no more than two pNICs regardless of whether some hosts include four pNICs. In addition, although some physical network topologies include LAG connections, an administrator may inadvertently disable LAG configurations in the virtual and physical network configuration settings for some or all such physical network topologies which leads to network configurations that are not optimized for using LAG capabilities when available. In some examples, an administrator may enable LAG configurations for some hosts and disable LAG configurations for others that also have LAG connections. In such scenarios, prior uses of the network configuration tool do not check when LAG configuration opportunities are missed.

Examples disclosed herein substantially reduce or eliminate the above-described manual processes of a human administrator when configuring virtual and physical networks of a physical rack by using an autonomous network topology rules-based network configuration process to configure virtual and physical networks of a physical rack in a way that humans could not do previously. For example, FIG. 1 is an example network topology rules-based network configuration state machine 100 representative of computer readable instructions that may be executed to implement an example virtual imaging appliance (VIA) 202 of FIG. 2 to configure virtual and physical networks for hosts 204 of a physical rack 206 of FIG. 2. That is, examples disclosed herein employ the example VIA 202 as a network configuration tool to perform operations that are represented in the state machine 100 of FIG. 1 as an example detection process 102, an example validation process 104, and an example configuration process 106.

In the example detection process 102 of FIG. 1, the VIA 202 autonomously sends probe request messages and receives probe response messages to/from the hosts 204 via a network (e.g., the network 208 of FIG. 2) to which the hosts 204 are connected and auto-detects how each host 204 in the physical rack 206 is physically connected to the network 208 via one or more ToR switches 210. The VIA 202 generates physical network connection information based on the auto-detected physical network connections between each host 204 and the one or more ToR switches 210 of the physical rack 206. For example, the VIA 202 uses the probe request messages and probe response messages for analyzing the physical network connections of the hosts 204 so that for each host 204 the VIA 202 can detect: (a) whether a LAG setting is enabled for the host, (b) a number of peer switches connected to the host, and (c) a number of LAGs configured for the host. In the illustrated example, the VIA 202 uses Link Layer Discovery Protocol (LLDP) packets to determine the number of peer switches (e.g., the ToR switches 210) to which a host 204 is physical connected. Also in the illustrated example, the VIA 202 uses Link Aggregation Control Protocol (LACP) packets to determine physical connections for which LAG is enabled. Based on the information in the probe response messages, the VIA 202 generates the physical network connection information for the hosts 204 of the physical rack 205 to be indicative of: (a) ones of the hosts 204 for which a LAG setting is enabled, (b) quantities of peer switches connected to the hosts 204, and (c) quantities of LAG groups configured for the hosts.

In the example detection process 102, the VIA 202 also generates network topologies of the hosts 204 based on the physical network connection information. For example, the VIA 202 generates a network topology of each host 204 by analyzing the physical network connection information relative to network topology structure rules indicative of at least one of: a quantity of pNICs per host 204, a quantity of ToR switches 210 connected per host 204, or whether a LAG is present per host 204.

In the example validation process 104 of FIG. 1, the VIA 202 implements machine-executed network topology rules-based analyses to analyze the network topologies of the hosts 204 relative to network topology validation rules to determine whether implementing the network topologies of the hosts 204 concurrently in the physical rack 206 is valid. In this manner, unlike prior uses of network configuration tools that require all physical network connections between hosts and ToR switches to be the same, examples disclosed herein employ the network topology validation rules to enable using different network topology types between different hosts and ToR switches in the same physical rack so long as they are valid combinations of topologies. Examples disclosed herein validate such combinations of network topologies by performing machine-executed network topology rules-based analyses on a per-host basis. In examples disclosed herein, the network topology validation rules are representative of requirements of a virtual cloud management system for a software defined datacenter (SDDC) platform. (An example virtual cloud management system that may be used with examples disclosed herein is the VMware Cloud Foundation (VCF) platform developed and provided by VMware, Inc.) In this manner, the VIA 202 uses the network topology validation rules to validate that the physical network connections of the hosts 204 satisfy such virtual cloud management system requirements. For example, one or more network topology validation rules may indicate that a combination of network topologies that include LAG and non-LAG connectivity to a ToR switch 210 is not a valid combination of topologies because the physical network cannot be configured in both LAG and non-LAG modes concurrently in a ToR switch 210. The VIA 202 may also apply the network topology validation rules to detect other types of invalid physical network connections in the validation process 104. In the illustrated example of FIG. 1, the VIA 202 notifies a user (e.g., an administrator) and, if applicable, the VIA 202 may perform a re-validation based on an updated physical network connection (e.g., an administrator may physically re-wire a host 204 to one or more ToR switches 210).

After the validation process 104 determines that the network topologies of the hosts 204 are valid for concurrent use in a corresponding physical rack 206, the example configuration process 106 is initiated and the VIA 202 autonomously configures virtual network settings and physical network settings for the hosts 204 and the ToR switches 210 of the physical rack 206. The example VIA 202 performs the virtual and physical network configurations based on the corresponding network topologies of the hosts 204. In this manner, examples disclosed herein substantially reduce or eliminate the need for manual configuration by an administrator which results in a number of technical improvements in the field of datacenter computing including faster configurations of physical rack systems, more optimal network performance, reduced likelihood of errors and network reconfigurations, and better user experiences. For example, using techniques disclosed herein, an overall process from detection of physical network connections to configuring virtual networks and physical networks of a 24-host physical rack can be accomplished in less than one minute, unlike prior techniques that require eight or more hours for such configurations.

Figure 2:
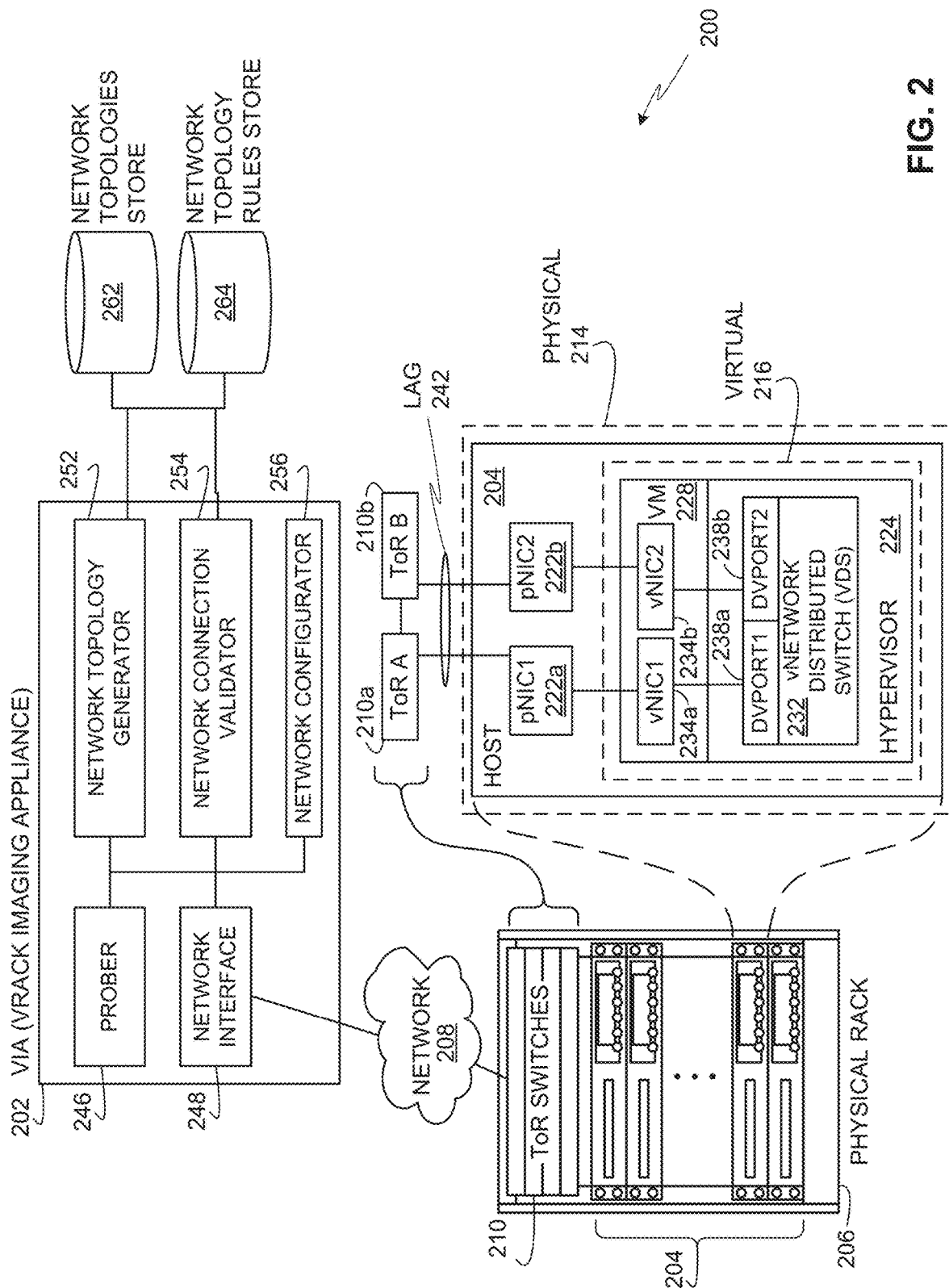
FIG. 2 is a block diagram of an example environment in which a VIA is in communication with a physical rack of physical server hosts.

FIG. 2 is a block diagram of an example environment 200 in which the example VIA 202 is in communication with the physical rack 206 that includes the hosts 204. The example VIA 202 is used to prepare the physical rack 206 to operate in a datacenter. In some examples, the VIA 202 is implemented on a jump server or jump host that is in network communication with the physical rack 206 to configure the physical rack 206 for deployment. For example, the physical rack 206 may be used in a SDDC to provide cloud computing services (e.g., infrastructure as a service (IaaS), platform as a service (PaaS), software as a service (SaaS), desktop as a service (DaaS), etc.), virtualized computing services, etc. In some examples, the VIA 202 is employed by a system integrator to prepare the physical rack 206 for distribution to a customer by configuring virtual networks, physical networks, operating systems, software, system configurations, etc. An example of a system integrator is an entity that receives and fulfills customer orders for computing hardware. Such a system integrator obtains computer hardware and/or software from other suppliers and assembles individual hardware components and/or software into functional computing units to fulfill customer orders. Alternatively, a system integrator may design and/or build some or all of the hardware components and/or software to be used in assembling computing units. In some examples, a system integrator prepares computing units for other entities (e.g., businesses and/or persons that do not own and are not owned by the system integrator). Alternatively, a system integrator may assemble computing units for use by the same entity as the system integrator (e.g., the system integrator may be a department of a company that orders and/or utilizes the assembled computing units). As used herein, the term customer refers to any person and/or entity that receives and/or operates the computing units supplied by a system integrator. In some examples, a system integrator is an entity independent of equipment manufacturers such as white-label equipment manufacturers that provide hardware (e.g., the physical rack 206 and/or the hosts 204 and/or the ToR switches 210 of the physical rack 206) without branding. In other examples, a system integrator is an original equipment manufacturer (OEM) partner that partners with OEMs (e.g., non-white label equipment manufacturers) that provide brand-labeled hardware. Example OEM hardware includes OEM Servers such as Hewlett-Packard® (HP) servers and Lenovo® servers, and OEM Switches such as Arista switches, and/or any other OEM server, switches, or equipment that are labeled by the original manufacturers.

According to the illustrated example of FIG. 2, the physical rack 206 is one type of computing system ordered from and/or assembled by a system integrator. The physical rack 206 is a combination of computing hardware and installed software that may be used by a customer to create and/or add to a virtual computing environment for running virtual machines (VMs) and/or containers. In the illustrated example, the physical rack 206 includes the hosts 204 (e.g., blade servers and/or other processing units such as network attached storage, storage area network hardware, etc.) and the ToR switches 210 to interconnect the hosts 204. In some examples, the physical rack 206 is also provided with spine switches to interconnect the ToR switches 210 of the physical rack 206 with other physical racks (e.g., other physical racks in a network environment such as a cloud computing environment). The physical rack 206 of the illustrated example is prepared by a system integrator in a partially configured state to enable the computing devices to be rapidly deployed at a customer location (e.g., in less than 2 hours).

In some examples, the VIA 202 retrieves software images and configuration data from a virtual systems solutions provider via the network 208 (and/or another network) for installation on the physical rack 206 during preparation of the physical rack 206. An example virtual systems solutions provider may be one or more entities that develop(s) and/or distributes(s) platform images and/or other types of software (e.g., VM images, container applications, drivers, operating systems, etc.) for use in deploying physical racks. In the illustrated example of FIG. 2, the example VIA 202 retrieves virtual and physical network configuration information so that it can push (e.g., transmit, send, etc.) virtual and physical network configuration settings to the hosts 204 and the ToR switches 210 of the physical rack 206 based on network topologies of the hosts 204 identified by the VIA 202. For example, the VIA 202 includes multiple network connections (e.g., virtual network connections, physical network connects, and/or any combination of virtual and network connections) with components of the physical rack 206. Using such network connections, the example VIA 202 connects to a management interface of the ToR switches 210 of the physical rack 206 and configures physical network configuration settings in the ToR switches 210. The example VIA 202 also connects to management network interfaces (e.g., out-of-band interfaces) of the hosts 204 installed in the physical rack 206 to configure virtual network configuration settings in the hosts 204.

In the illustrated example of FIG. 2, a physical environment 214 and a virtual environment 216 of a host 204 are shown in detail as connected to a first ToR switch 210a and a second ToR switch 210b. The example physical environment 214 includes the hardware-level components of the host 204 which may include one or more central processing units (CPUs), one or more memory devices, one or more storage units, one or more graphics processing units (GPUs), one or more pNICs, etc. In the illustrated example, two pNICs 222a-b are provided in the host 204. In other examples, more pNICs (e.g., four pNICs) may be provided in the host 204. The pNICs 222a-b enable physical network connections between the host 204 and the ToR switches 210a-b.

In the illustrated example of FIG. 2, the host 204 executes an example hypervisor 224, which provides local virtualization services to create the example virtual environment 216 in the host 204. The example hypervisor 224 may be implemented using any suitable hypervisor (e.g., VMWARE® ESX® hypervisor, Microsoft HYPER-V® hypervisor, and Kernel Based Virtual Machine (KVM)). In the illustrated example of FIG. 2, the hypervisor 224 executes one or more VMs (e.g., an example VM 228) and an example virtual network (vnetwork) distributed switch (VDS) 232. The example VDS 232 functions as a single virtual switch that can be deployed in a single host and/or across multiple hosts. This enables setting virtual network configurations that span across all the member hosts of the VDS 232 and allows VMs to maintain consistent virtual network configurations even when such any such VM is migrated across the multiple member hosts. In the illustrated example, the VM 228 is configured to include two vNICs 234a and 234b for use by applications executed by the VM 228 to perform network communications via the network 208. The example vNICs 234a-b are created by running virtualization services that enable the VM 228 to employ the pNICs 222a-b of the host 204 through the VDS 232 for network communications. In the illustrated example, the first vNIC 234a corresponds to the first pNIC 222a such that the first pNIC 222a is allocated as a physical resource by the hypervisor 224 for use by the VM 228 as a virtual network interface resource represented as the first vNIC 234a. Also in the illustrated example, the second vNIC 234b corresponds to the second pNIC 222b such that the second pNIC 222b is allocated as a physical resource by the hypervisor 224 for use by the VM 228 as a virtual network interface resource represented as the second vNIC 234a. The example vNICs 234a-b connect to the ToR switches 210a-b via the pNICs 222a-b. Although the vNICs 234a-b are shown in FIG. 2 as connected directly to the pNICs 222a-b, such connections are logical connections shown for ease of understanding an example communicative relationship between the vNICs 234a-b and the pNICs 222a-b. In an example implementation, the vNICs 234a-b connect to the pNICs 222a-b through the dvports 238a-b and the VDS 232 such that the pNICs 222a-b are connected to the VDS 232 and exchange network packets with the vNICs 234a-b via the VDS 232. In the illustrated example, the connections between the pNICs 222a-b and the ToR switches 210a-b of FIG. 2 are physical connections that are detectable by the VIA 202 during the detection process 102 of FIG. 1.

In the illustrated example, the VDS 232 provides two dvports 238a-b assignable to the vNICs 234a-b of the VM 228 to enable network communications between applications or processes running on the VM 228 and the ToR switches 210a-b. The dvports 238a-b of the illustrated example are assigned port numbers by the VDS 232 to identify a source/destination side of a connection that terminates at the hypervisor 224. The VDS 232 uses the port numbers of the dvports 238a-b to determine the vNICs 234a-b and the applications to which received network communications should be delivered. In some examples, the VDS 232 is configured with one or more port groups. A port group is a grouping of multiple dvports that enables applying the same virtual network configuration settings to multiple dvports in that port group concurrently. For example, a port group can be instantiated in one VDS 232 to group multiple dvports of the VDS 232 under the same port group. Alternatively, a port group can be instantiated across multiple VDSs to group multiple dvports across those VDSs under the same port group. In this manner, when it is desired to apply the same virtual network configuration settings to multiple dvports in the same VDS or across multiple VDSs, those dvports can be grouped in one port group, and the virtual network configuration settings can be applied to that port group so that the multiple dvports of the port group inherit the same virtual network configuration settings applied to the port group.

In the illustrated example, the physical rack 206 includes a LAG 242 as an aggregated group of the physical connections of the first and second pNICs 222a-b (corresponding to the first and second vNICs 234a-b) connected between the host 204 and the first and second ToR switches 210a-b. A LAG is a bundle of multiple pNICs. In some examples, different pNICs of a LAG can be connected to separate physical ToR switches. Doing so provides high-available networks with redundant paths between any two hosts. For example, in FIG. 2, the first pNIC 222a of the LAG 242 is connected to the first ToR switch 210a, and the second pNIC 222b of the LAG 242 is connected to the second ToR switch 210b.

Turning in detail to the VIA 202 of the illustrated example, the VIA 202 is provided with an example prober 246, an example network interface 248, an example network topology generator 252, an example network connection validator 254, and an example network configurator 256. The example VIA 202 is provided with the example prober 246 to send probe request messages via the network 208 and to receive probe response messages via the network 208 to obtain physical network connection information from the hosts 204 indicative of physical network connections between the hosts 204 and the ToR switches 210. In the illustrated example, the prober 246 uses LLDP packets to determine the number of peer switches (e.g., the ToR switches 210) to which a host 204 is physical connected. Also in the illustrated example, the prober 246 uses LACP packets to determine physical connections for which LAG is enabled. In the illustrated example, the prober 246 sends the probe request messages as broadcast messages for receipt by all of the hosts 204 of the physical rack 206. In this manner, the prober 246 need not know specific destination addresses (e.g., internet protocol (IP) addresses or media access control (MAC) addresses) of the hosts 204 to request and obtain the physical network connection information from the hosts 204. An example probe request message format is shown in FIG. 3.

Figure 3:
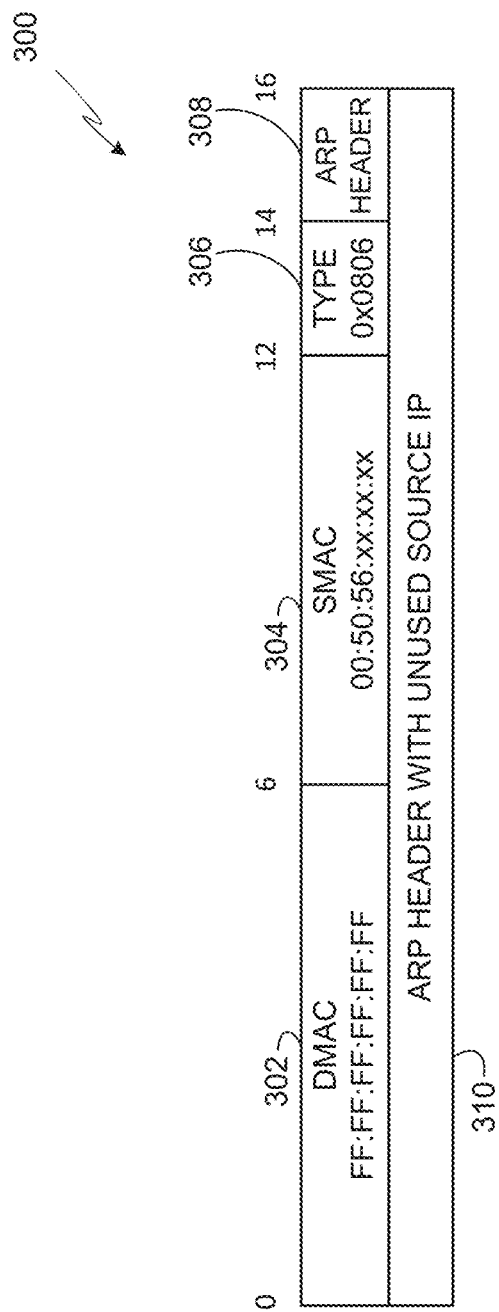
FIG. 3 is an example probe request message format for use in obtaining physical network connection information of the physical server hosts.

Turning briefly to FIG. 3, the example probe request message format 300 uses MAC addresses to specify source and destination addresses. For example, the probe request message format 300 includes a destination MAC (DMAC)

address 302 of the intended recipient and a source MAC (SMAC) address 304 of the sender. In the illustrated example, the SMAC address 304 is the MAC address of the VIA 202. Probe request messages sent by the example prober 246 are structured to traverse the network 208 as much as possible. As such, the example prober 246 sends the probe request messages as broadcast packets. To use broadcast packets, the example prober 246 sets the destination MAC address 302 to a hexadecimal-based address of FF:FF:FF:FF:FF:FF in the broadcast packet. In addition, the example prober 246 sets the source MAC address 304 to a unique address so that it is distinguishable from other broadcast messages sent by other devices through the network 208. To avoid conflicts with an existing address space, any unused MAC address can be used as the source MAC address 304. For example, a manufacturer or provider of the VIA 202 may structure the prober 246 to use an unused MAC address in its assigned MAC address range (e.g., 00:50:56:xx:xx:xx). The probe request message format 300 also includes an example type field 306, an example address resolution protocol (ARP) header field 308, and an unused source IP address field 310. The example type field 306 is provided with a probe request type identifier field to identify the purpose of a probe request message. In the illustrated example, the prober 246 stores a value in the type field 306 that indicates the purpose of probe request messages as querying for physical network connection information. In this manner, when the hosts 204 receive the probe request messages, the hosts 204 respond by sending corresponding probe response messages that include their physical network connection information. The example ARP header field 308 is used by the prober 246 to request IP addresses of hosts 204. That is, the prober 246 stores a value in the ARP header field 308 indicative of whether hosts 204 should provide their IP addresses in the probe response messages sent by the hosts 204 to the VIA 202. The example unused source IP address field 310 is used by the prober 246 to identify an IP address of the VIA 202. The hosts 204 can then use the source IP address specified in the unused source IP address field 310 to send probe response messages back to the VIA 202.

Returning to FIG. 2, the VIA 202 is provided with the example network interface 248 to enable the VIA 202 to communicate through the network 208. For example, the network interface 248 sends probe request messages from the prober 246 into the network 208 and receives probe response messages from the network 208 for delivery to the prober 246. The example network interface 248 also sends network configuration information through the network 208 for delivery to the hosts 204 and/or to the ToR switches 210 to configure virtual and physical network configuration settings.

The VIA 202 is provided with the example network topology generator 252 to generate network topologies of the hosts 204 based on physical network connection information indicative of physical network connections between the hosts 204 and one or more of the ToR switches 210 in the physical rack 206. In the illustrated example, the network topology generator 252 generates the network topologies of the hosts 204 during the example detection process 102 of FIG. 1. The example network topology generator 252 stores identified network topologies of the hosts 204 in an example network topologies store 262. For example, the network topology generator 252 may create a data record in the network topologies store 262 for each host 204 and store the corresponding network topology and host identifier for that host 204 in the data record. The network topologies store 262 of the illustrated example may be a database or any other type of data structure stored in a hardware memory device and/or a hardware storage device. In some examples, the network topologies store 262 is local to the VIA 202 in that it is stored in a local memory (e.g., the volatile memory 1014, the nonvolatile memory 1016, the local memory 1013, and/or the mass storage 1028 of FIG. 1) accessible via a local memory bus in circuit with a processor (e.g., the processor 1012 of FIG. 10) that executes the VIA 202. In other examples, the network topologies store 262 is remote from the VIA 202 such that it is accessed via a network connection (e.g., a local area network (LAN) connection or a wide area network (WAN) connection) accessible by the VIA 202 using the network interface 248.

In the illustrated example, the network topology generator 252 generates the network topologies of the hosts 204 based on network topology structure rules. Example network topology structure rules include physical network connection criteria representative of different network topologies such as example network topologies described below in connection with FIG. 4. In other examples, the network topology structure rules may include physical network connection criteria representative of other network topologies in addition to or instead of the network topologies described below in connection with FIG. 4. In the illustrated example, the network topology structure rules are stored in an example network topology rules store 264. The network topology rules store 264 of the illustrated example may be a database or any other type of data structure stored in a hardware memory device and/or a hardware storage device. In some examples, the network topology rules store 264 is local to the VIA 202 in that it is stored in a local memory (e.g., the volatile memory 1014, the nonvolatile memory 1016, the local memory 1013, and/or the mass storage 1028 of FIG. 1) accessible via a local memory bus in circuit with a processor (e.g., the processor 1012 of FIG. 10) that executes the VIA 202. In other examples, the network topology rules store 264 is remote from the VIA 202 such that it is accessed via a network connection (e.g., a local area network (LAN) connection or a wide area network (WAN) connection).

The VIA 202 is provided with the example network connection validator 254 to determine whether implementing the network topologies of the hosts 204 concurrently in the physical rack 206 is valid based on evaluating the network topologies relative to one or more network topology validation rules. In the illustrated example, the network connection validator 254 evaluates the network topologies of the hosts 204 during the validation process 104 of FIG. 1. An example network topology validation rule for use by the network connection validator 254 may indicate that a combination of network topologies that include LAG and non-LAG connectivity to a ToR switch 210 is not a valid combination of topologies because the physical network cannot be configured in both LAG and non-LAG modes concurrently in a ToR switch 210. Other example network topology validation rules may additionally or alternatively be used to detect other types of valid and/or invalid combinations of concurrent network topologies in a physical rack 206. For example, the network topology validation rules may specify different combinations of network topologies (e.g., combinations of the example network topologies of FIG. 4) that are valid and/or different combinations of network topologies that are invalid. In the illustrated example, the network topology validation rules are also stored in an example network topology rules store 264.

The VIA 202 is provided with the example network configurator 256 to configure virtual and physical network configuration settings in the hosts 204 and the ToR switches 210. The example network configurator 256 configures the virtual and physical network configuration settings during the configuration process 106 of FIG. 1 after the network connection validator 254 validates the network topologies. For example, the network configurator 256 configures the VDS 232 in a host 204 based on a corresponding one of the network topologies of the host 204, and configures one or more of the ToR switches 210 in communication with the host 204 based on the same corresponding network topology of the host 204.

Figure 4:
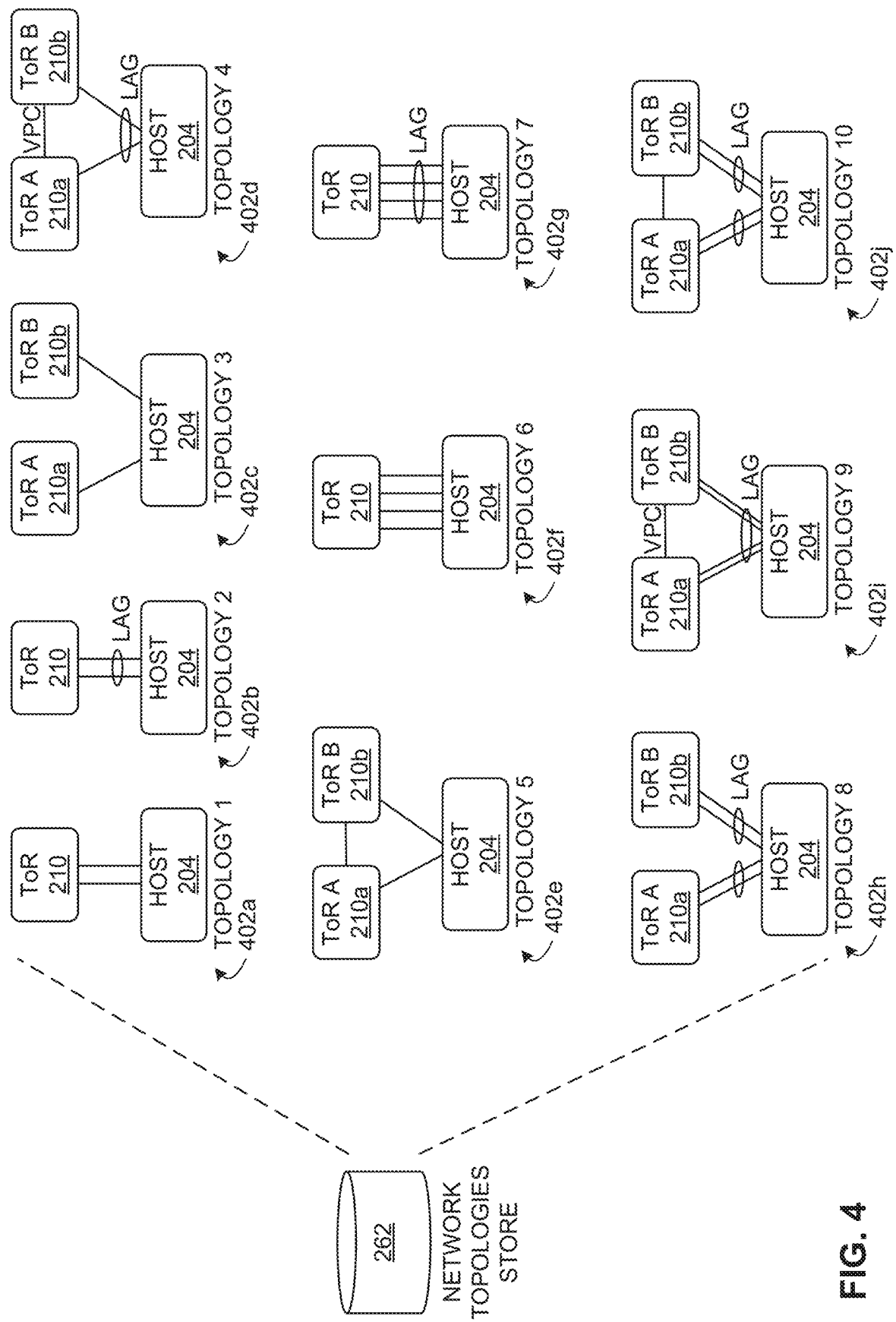
FIG. 4 is a network topologies store in which the VIA of FIG. 2 stores network topology records for the physical server hosts of the physical rack of FIG. 2 indicative of network topologies of the hosts.

FIG. 4 is the example network topologies store 262 of FIG. 2 shown with example network topologies 402a-j that can be stored as network topologies of the hosts 204 in network topology data records. Although the network topologies store 262 is shown as storing the example network topologies 402a-j, the network topologies store 262 may also store other network topologies in addition to or instead of the example network topologies 402a-j. In the illustrated example, non-LAG network topologies are shown at reference numerals 402a, 402c, 402e, and 402f, and LAG network topologies are shown at reference numerals 402b, 402d, 402g, 402h, 402i, and 402j.

The non-LAG network topologies include an example single-switch, double-link network topology 402a in which there are two physical connections between a host 204 and a ToR switch 210. Another non-LAG network topology is an example double-switch, double-link network topology 402c in which there are two physical connections between a host 204 and respective ToR switches 210a-b. Another non-LAG network topology is an example double-switch, double-link with peer-link connectivity 402e in which there are two physical connections between a host 204 and respective ToR switches 210a-b, and includes an inter-switch connection between two peer ToR switches 210a-b. Another non-LAG network topology is an example single-switch, quadruple-link network topology 402f in which there are four physical connections between a host 204 and a ToR switch 210.

The LAG network topologies include an example single-switch, double-link LAG network topology 402b in which there are two physical connections in a LAG group between a host 204 and a ToR switch 210. Another LAG network topology is an example double-switch, double-link with peer-link virtual port channel (VPC) connectivity network topology 402d in which there are two physical connections in a LAG group between a host 204 and respective ToR switches 210a-b, and includes an inter-switch connection between the two peer ToR switches 210a-b on which a VPC is instantiated to make multiple physical connections between the ToR switches 210a-b appear as a single virtual connection. Another LAG network topology is an example single-switch, quadruple-link LAG network topology 402g in which there are four physical connections in a LAG group between a host 204 and a ToR switch 210. Another LAG network topology is an example double-switch, multi-link, double-LAG network topology 402h in which there are two pairs of physical connections in respective LAG groups between a host 204 and respective ToR switches 210a-b. Another LAG network topology is an example double-switch, multi-link, double-LAG with peer-link VPC connectivity network topology 402i in which a single LAG includes two pairs of physical connections established between a host 204 and respective ToR switches 210a-b, and includes an inter-switch connection between the two peer ToR switches 210a-b on which a VPC is instantiated to make multiple physical connections between the ToR switches 210a-b appear as a single virtual connection. Another LAG network topology is an example double-switch, multi-link double-LAG with peer-link connectivity network topology 402j in which there are two pairs of physical connections in respective LAG groups between a host 204 and respective ToR switches 210a-b, and includes an inter-switch connection between the two peer ToR switches 210a-b.

While an example manner of implementing the VIA 202 is illustrated in FIG. 2, one or more of the elements, processes and/or devices illustrated in FIG. 2 may be combined, divided, re-arranged, omitted, eliminated and/or implemented in any other way. Further, the example prober 246, the example network interface 248, the example network topology generator 252, the example network connection validator 254, the example network configurator 256 and/or, more generally, the example VIA 202 of FIG. 2 may be implemented by hardware, software, firmware and/or any combination of hardware, software and/or firmware. Thus, for example, any of the example prober 246, the example network interface 248, the example network topology generator 252, the example network connection validator 254, the example network configurator 256 and/or, more generally, the VIA 202 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example prober 246, the example network interface 248, the example network topology generator 252, the example network connection validator 254, and/or the example network configurator 256 is/are hereby expressly defined to include a non-transitory computer readable storage device or storage disk such as a memory, a digital versatile disk (DVD), a compact disk (CD), a Blu-ray disk, etc. including the software and/or firmware. Further still, the example VIA 202 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
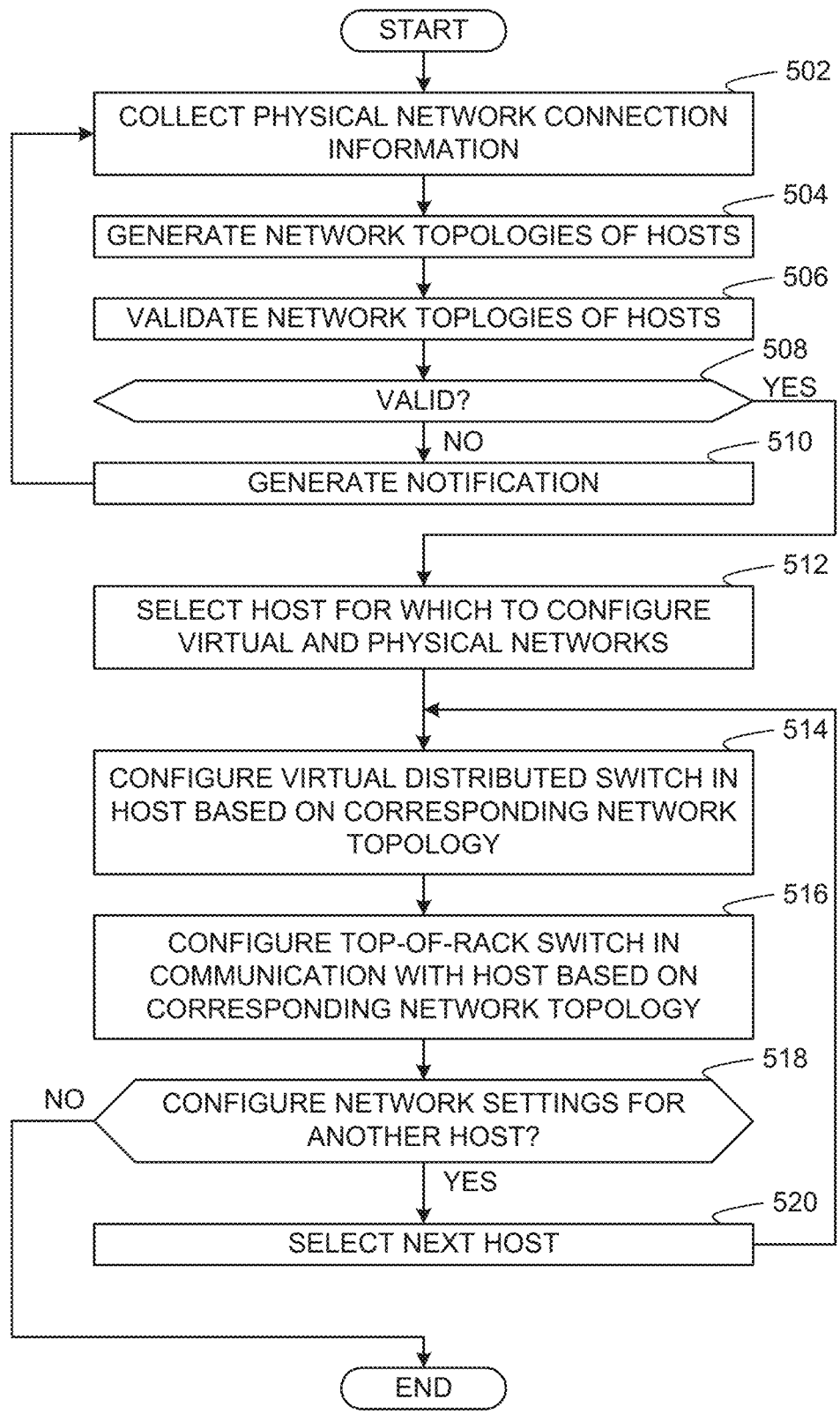
FIG. 5 is a flowchart representative of example machine-readable instructions that may be executed to implement the VIA of FIG. 2 to configure virtual and physical networks for the physical server hosts of the physical rack of FIG. 2.
Figure 6:
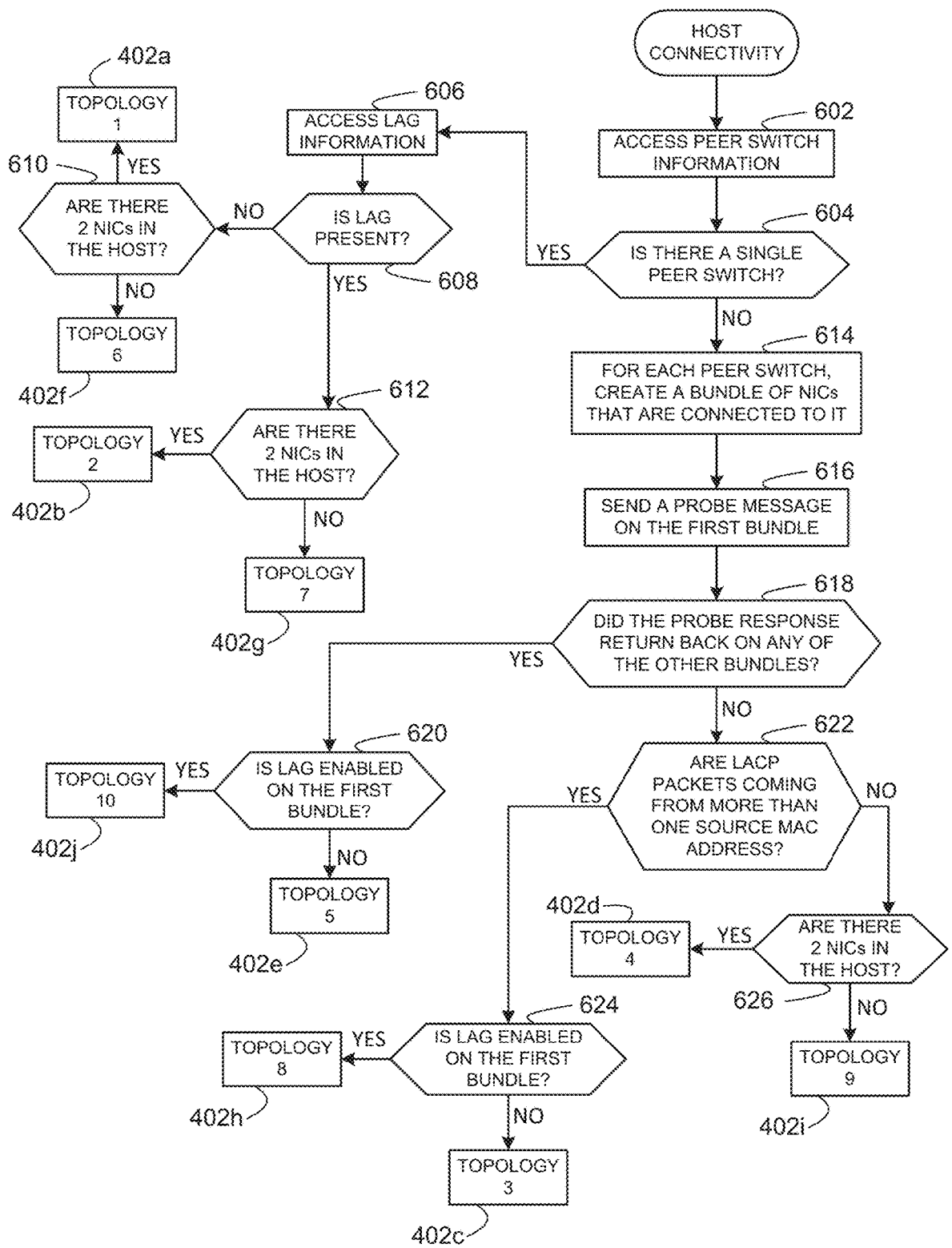
FIG. 6 is a flowchart representative of example machine-readable instructions that may be executed to implement the VIA of FIG. 2 to generate network topologies of the physical server hosts of the physical rack of FIG. 2 based on physical network connection information of the hosts.
Figure 7:
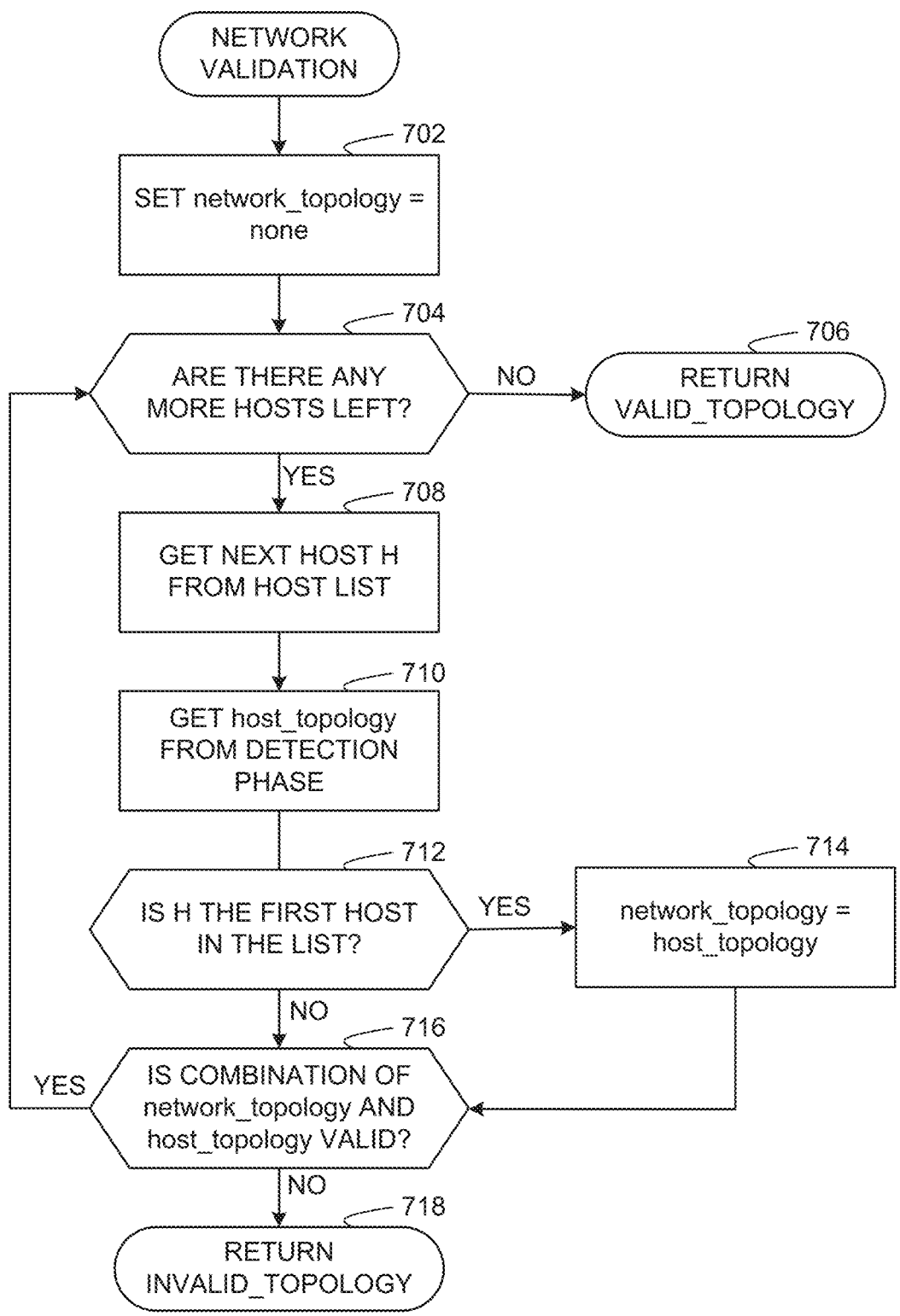
FIG. 7 is a flowchart representative of example machine-readable instructions that may be executed to implement the VIA of FIG. 2 to validate network topologies of the physical server hosts of the physical rack of FIG. 2.

Example flowcharts of FIGS. 5-7 and example pseudo-code of FIGS. 8 and 9 are representative of example hardware logic, machine readable instructions, hardware-implemented state machines, and/or any combination thereof for implementing the VIA 202 of FIG. 2. The machine-readable instructions may be one or more executable programs or portion of one or more executable programs for execution by a computer processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entirety of the program(s) and/or parts thereof could alternatively be executed by a device other than the processor 1012 and/or embodied in firmware or dedicated hardware. Further, although the example program(s) is/are described with reference to the flowcharts illustrated in FIGS. 5-7 and/or the pseudocode of FIGS. 8 and 9, many other methods of implementing the example VIA 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-7 and/or FIGS. 8 and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 5 is a flowchart representative of example machine-readable instructions that may be executed to implement the VIA 202 of FIG. 2 to configure virtual and physical networks for the hosts 204 of the physical rack 206 of FIG. 2. In the illustrated example of FIG. 5, the operations of blocks 502 and 504 are performed during the detection process 102 of FIG. 1, the operation of block 506 is performed during the validation process 104 of FIG. 1, and the operations of blocks 512, 514, 516, 518, and 520 are performed during the configuration process 106 of FIG. 1. Initially at block 502, the example prober 246 (FIG. 2) collects physical network connection information. For example, the prober 246 uses the network interface 248 (FIG. 2) to broadcast probe request messages to the hosts 204 (FIG. 2) via the network 208 (FIG. 2) to request physical network connection information indicative of physical network connections between the hosts 204 and one or more of the ToR switches 210 in the physical rack 206 of FIG. 2. In response, the prober 246 receives probe response messages including the physical network connection information from the hosts 204.

At block 504, the example network topology generator 252 (FIG. 2) generates network topologies of the hosts 204 based on the physical network connection information indicative of physical network connections between the hosts 204 and one or more ToR switches 210 of the physical rack 206. For example, the network topology generator 252 can generate the network topologies based on network topology structure rules stored in the network topology rules store 264 (FIG. 2). As discussed above in connection with FIG. 2, the example network topology generator 252 stores the network topologies in the network topologies store 262 of FIGS. 2 and 3. An example process that may be used to generate the network topologies at block 504 is described below in connection with FIG. 6.

At block 506, the example network connection validator 254 (FIG. 2) validates the network topologies of the hosts 204 by determining whether implementing the network topologies of the hosts 204 concurrently in the physical rack 206 is valid based on evaluating the network topologies relative to one or more network topology validation rules. For example, the network connection validator 254 may use network topology validation rules stored in the network topology rules store 264 to evaluate and validate the network topologies generated by the network topology generator 252 and stored in data records of the network topologies store 262. An example process that may be used to evaluate the network topologies at block 506 is described below in connection with FIG. 7.

If at block 508 the network connection validator 254 determines that the network topologies of the hosts 204 are not valid for concurrent implementation in the physical rack 206, the network connection validator 254 generates a notification (bock 510) for presentation to an administrator to indicate that the combination of the network topologies of the hosts 204 is invalid. Control then returns to block 502 at which new physical network connection information may be collected to reflect any changes in physical network connections made by the administrator in response to the notification of block 510. If at block 508 the network connection validator 254 determines that the network topologies of the hosts 204 are valid, control advances to block 512 to configure virtual and physical networks for the hosts 204 in the physical rack 206.

At block 512, the example network configurator 256 (FIG. 2) selects a host 204 for which to configure virtual and physical networks. For example, the network configurator 256 selects one of the hosts 204 of the physical rack 206 for which network topologies were validated by the network connection validator 254 at block 506. At block 514, the example network configurator 256 configures virtual network configuration settings for the VDS 232 in the selected one of the hosts 204 based on the network topology corresponding to that host 204. For example, the network configurator 256 creates at least one dvport 238*a-b* in the VDS 232 for at least one pNIC 222*a-b* of the host 204 and/or configures a portgroup property for the at least one dvport 238*a-b*. In examples in which the network topology includes a LAG connection (e.g., the LAG 242 of FIG. 2) for a pNIC bundle including multiple pNICs (e.g., the pNICs 222*a-b* of FIG. 2) of the host 204, the network configurator 256 creates one or more dvports (e.g., the dvports 238*a-b* of FIG. 2) in the VDS 232 for the pNICs in the pNIC bundle. In addition, if the pNIC bundle is to be in a portgroup, the network configurator 256 configures corresponding portgroup properties in the VDS 232 for use with the LAG of the pNIC bundle. Otherwise, in examples in which the pNIC bundle includes a single pNIC of the host 204 not in a LAG connection, the network configurator 256 creates a dvport (e.g., one of the dvports 238a-b of FIG. 2) in the VDS 232 with the pNIC in the pNIC bundle. In addition, if the pNIC is to be part of a portgroup, the network configurator 256 configures corresponding portgroup properties in the VDS 232 for use with the pNIC.

At block 516, the example network configurator 256 configures physical network configuration settings for one or more ToR switches 210 (FIG. 2) in communication with the selected host 204 based on the corresponding one of the network topologies. For example, if the network topology includes a LAG connection for a pNIC bundle that includes multiple pNICs of the host 204, the network configurator 256 configures LAG properties on ports of the one or more ToR switches 210 for the LAG connected to the selected host 204. Otherwise, if the pNIC bundle includes a single pNIC of the host 204 not in a LAG connection, the network configurator 256 enables a ToR switch port connected to the selected host 204.

At block 518, the network configurator 256 determines whether there is another host 204 for which to configure network settings. For example, the network configurator 256 determines whether there is another data record in the network topologies store 262 for a host 204 that still needs network configuration settings to be configured. If there is another host 204 for which network configuration settings need to be made, the network configurator 256 selects the next host 204 (block 520), and control returns to block 514. For example, the network configurator 256 may select the next host 204 based on data records in the network topologies store 262. Otherwise, if at block 518 the network configurator 256 determines that there is not another host 204 for which network configuration settings are to be configured, the example process(es) of FIG. 5 end.

FIG. 6 is a flowchart representative of example machine-readable instructions that may be executed to implement the VIA 202 of FIG. 2 to generate network topologies of the hosts 204 of the physical rack 206 of FIG. 2 based on physical network connection information of the hosts 204. In the illustrated example, the network topology generator 252 generates the network topologies by analyzing physical network connection information of the hosts 204 relative to the network topology structure rules to determine at least one of a quantity of physical network interface cards per host 204, a quantity of ToR switches (e.g., peer switches) connected per host 204, and/or whether a LAG is present per host 204.

The example process of FIG. 6 may be used to implement block 504 of FIG. 5 to generate the network topologies of the hosts 204. Initially at block 602, the network topology generator 252 accesses peer switch information in the physical network connection information being analyzed. For example, the network topology generator 252 accesses peer switch information of physical network connection information of a host 204. The peer switch information is indicative of the number of ToR switches 210 physically connected to the host 204. At block 604, the network topology generator 252 determines whether there is a single peer switch (e.g., a single ToR switch 210). If there is a single peer switch, control advances to block 606 at which the network topology generator 252 accesses LAG information in the physical network connection information being processed. For example, the network topology generator 252 accesses LAG information of the physical network connection information of the host 204.

At block 608, the network topology generator 252 determines whether a LAG is present. If a LAG is not present, the network topology generator 252 determines whether there are two pNICs (e.g., the pNICs 222a-b of FIG. 2) in the host 204 (block 610). If the network topology generator 252 determines at block 610 that there are two pNICs in the host 204, the network topology generator 252 determines that the network topology of the host 204 corresponds to a network topology 1, which is the example single-switch, double-link network topology 402a of FIG. 4. As such, to identify the single-switch, double-link network topology 402a as corresponding to the network topology of the host 204, the network topology generator 252 uses a network topology structure rule from the network topology rules store 264 that includes physical network connection criteria specifying a single ToR switch connected to the host 204 via two pNICs without a LAG.

If the network topology generator 252 determines at block 610 that there are not two pNICs in the host 204, the network topology generator 252 determines that there is one pNIC in the host 204 and the network topology of the host 204 corresponds to a network topology 6, which is the example single-switch, quadruple-link network topology 402f of FIG. 4. As such, to identify the single-switch, quadruple-link network topology 402f as corresponding to the network topology of the host 204, the network topology generator 252 uses a network topology structure rule from the network topology rules store 264 that includes physical network connection criteria specifying a single ToR switch connected to the host 204 via one pNIC without a LAG.

Returning to block 608, if the network topology generator 252 determines that a LAG is present, the network topology generator 252 determines whether there are two pNICs (e.g., the pNICs 222a-b of FIG. 2) in the host 204 (block 612). If the network topology generator 252 determines at block 612 that there are two pNICs in the host 204, the network topology generator 252 determines that the network topology of the host 204 corresponds to a network topology 2, which is the example single-switch, double-link LAG network topology 402b of FIG. 4. As such, to identify the single-switch, double-link LAG network topology 402b as corresponding to the network topology of the host 204, the network topology generator 252 uses a network topology structure rule from the network topology rules store 264 that includes physical network connection criteria specifying a single ToR switch connected to the host 204 via two pNICs with a LAG.

If the network topology generator 252 determines at block 612 that there are not two pNICs in the host 204, the network topology generator 252 determines that there is one pNIC in the host 204 and the network topology of the host 204 corresponds to a network topology 7, which is the example single-switch, quadruple-link LAG network topology 402g of FIG. 4. As such, to identify the single-switch, quadruple-link LAG network topology 402g as corresponding to the network topology of the host 204, the network topology generator 252 uses a network topology structure rule from the network topology rules store 264 that includes physical network connection criteria specifying a single ToR switch connected to the host 204 via one pNIC with a LAG.

Returning to block 604, if the network topology generator 252 determines that there is not a single peer switch in the physical network connection information being evaluated, the network topology generator 252 determines that there are two peer switches (e.g., the ToR switches 210a-b of FIG. 2), and control advances to block 614. At block 614, for each peer switch, the network topology generator 252 creates a bundle of pNICs connected to that peer switch. The example prober 246 (FIG. 2) sends a probe request message on a first one of the pNIC bundles (block 616). At block 618, the network topology generator 252 determines whether a corresponding probe response message was returned back on any of the other pNIC bundles. In the illustrated example, a probe response message returning on another pNIC bundle is indicative of a peer-link connection established between two ToR switches.

If the network topology generator 252 determines at block 618 that a probe response message was received back by the prober 246 on any of the other pNIC bundles, the network topology generator 252 determines whether LAG is enabled on the first one of the pNIC bundles (block 620). If LAG is enabled on the first one of the pNIC bundles, the network topology generator 252 determines that the network topology of the host 204 corresponds to a network topology 10, which is the example double-switch, multi-link double-LAG with peer-link connectivity network topology 402j of FIG. 4. As such, to identify the double-switch, multi-link double-LAG with peer-link connectivity network topology 402j as corresponding to the network topology of the host 204, the network topology generator 252 uses a network topology structure rule from the network topology rules store 264 that includes physical network connection criteria specifying two ToR switches connected to the host 204 via two respective bundles of pNICs (e.g., two pNICs per pNIC bundle) with respective LAGs and a peer-link connection between the two ToR switches.

If at block 620 the network topology generator 252 determines that LAG is not enabled on the first one of the pNIC bundles, the network topology generator 252 determines that the network topology of the host 204 corresponds to a network topology 5, which is the example double-switch, double-link with peer-link connectivity 402e of FIG. 4. As such, to identify the double-switch, double-link with peer-link connectivity 402e as corresponding to the network topology of the host 204, the network topology generator 252 uses a network topology structure rule from the network topology rules store 264 that includes physical network connection criteria specifying two ToR switches connected to the host 204 via two respective pNICs (e.g., a single pNIC per pNIC bundle) without LAGs and with a peer-link connection between the two ToR switches.

Returning to block 618, if the network topology generator 252 determines that a probe response message was not received back by the prober 246 on any of the other pNIC bundles, control advances to block 622 at which the network topology generator 252 determines whether any LACP packets were received by the prober 246 from more than one source MAC address. For example, this information may be collected as part of the physical network connection information of the hosts 204. In the illustrated example, LACP packets received from more than one source MAC address are indicative that there is no peer-link between ToR switches and, as such, both ToR switches (with respective MAC addresses) returned LACP packets to the prober 246. If the network topology generator 252 determines that LACP packets were received from more than one source MAC address, control advances to block 624 at which the network topology generator 252 determines whether LAG is enabled on the first one of the pNIC bundles. If LAG is enabled on the first one of the pNIC bundles, the network topology generator 252 determines that the network topology of the host 204 corresponds to a network topology 8, which is the example double-switch, multi-link, double-LAG network topology 402h of FIG. 4. As such, to identify the double-switch, multi-link, double-LAG network topology 402h as corresponding to the network topology of the host 204, the network topology generator 252 uses a network topology structure rule from the network topology rules store 264 that includes physical network connection criteria specifying two ToR switches connected to the host 204 via two respective pNIC bundles (e.g., two pNICs per pNIC bundle) with respective LAGs and without a peer-link connection between the two ToR switches.

If at block 624 the network topology generator 252 determines that LAG is not enabled on the first one of the pNIC bundles, the network topology generator 252 determines that the network topology of the host 204 corresponds to a network topology 3, which is the example double-switch, double-link network topology 402c of FIG. 4. As such, to identify the double-switch, double-link network topology 402c as corresponding to the network topology of the host 204, the network topology generator 252 uses a network topology structure rule from the network topology rules store 264 that includes physical network connection criteria specifying two ToR switches connected to the host 204 via two respective pNICs (e.g., a single pNIC per pNIC bundle) without LAGs and without a peer-link connection between the two ToR switches.

Returning to block 622, if the network topology generator 252 determines that LACP packets were not received from more than one source MAC address, control advances to block 626. In the illustrated example, not receiving LACP packets from more than one source MAC address indicates the presence of a peer-link between the two ToR switches such that the ToR switches can work cooperatively to only send LACP packets form one source MAC address (e.g., a source MAC address of the first ToR switch 210a or a source MAC address of the second ToR switch 210b). At block 626 the network topology generator 252 determines whether there are two pNICs (e.g., the pNICs 222a-b of FIG. 2) in the host 204. If the network topology generator 252 determines at block 626 that there are two pNICs in the host 204, the network topology generator 252 determines that the network topology of the host 204 corresponds to a network topology 4, which is the example double-switch, double-link with peer-link VPC connectivity network topology 402d of FIG. 4. As such, to identify the double-switch, double-link with peer-link VPC connectivity network topology 402d as corresponding to the network topology of the host 204, the network topology generator 252 uses a network topology structure rule from the network topology rules store 264 that includes physical network connection criteria specifying two ToR switches connected to the host 204 via two respective pNICs (e.g., a single pNIC per pNIC bundle) grouped in a LAG and a peer-link connection between the two ToR switches.

If the network topology generator 252 determines at block 626 that there are not two pNICs in the host 204, the network topology generator 252 determines that there are more than two pNICs in the host 204 (e.g., four pNICs) and the network topology of the host 204 corresponds to a network topology 9, which is the example double-switch, multi-link, double-LAG with peer-link VPC connectivity network topology 402i of FIG. 4. As such, to identify the double-switch, multi-link, double-LAG with peer-link VPC connectivity network topology 402i as corresponding to the network topology of the host 204, the network topology generator 252 uses a network topology structure rule from the network topology rules store 264 that includes physical network connection criteria specifying two ToR switches connected to the host 204 via two respective pNIC bundles (e.g., two pNICs per pNIC bundle) grouped in a LAG and a peer-link connection between the two ToR switches.

Using the above process of FIG. 6, the network topology generator 252 can generate the network topologies of the available hosts 204. When the network topology generator 252 finishes generating the network topologies of the hosts 204, the example process of FIG. 6 ends, and control returns to a calling function or process such as the example process(es) of FIG. 5.

FIG. 7 is a flowchart representative of example machine-readable instructions that may be executed to implement the VIA 202 of FIG. 2 to validate network topologies of the hosts 204 of the physical rack 206 of FIG. 2 based on network topology validation rules (e.g., stored in the network topology rules store 264). The example process of FIG. 7 can be used to implement block 506 of FIG. 7 to determine whether implementing the network topologies of the hosts 204 concurrently in the physical rack 206 is valid based on evaluating the network topologies relative to one or more network topology validation rules. In the illustrated example of FIG. 7, the network connection validator 254 evaluates the network topology of each host 204 in combination with the network topology of each of the other hosts 204 of the physical rack 206 to determine whether any combination of network topologies of any two hosts 204 is invalid for implementing concurrently in the physical rack 206.

Initially at block 702, the network connection validator 254 initializes a reference network topology parameter "network_topology" to none. The reference network_topology parameter is to store a current network topology of a current host 204 to analyze for validity in combination with network topologies of the other hosts 204 of the physical rack 206. At block 704, the network connection validator 254 determines whether there is a host 204 to evaluate. When there is a host 204 to evaluate, the network connection validator 254 selects one of the hosts 204 of a host list of the physical rack 206 (block 708). The example network connection validator 254 obtains the corresponding network topology of the selected host 204 (block 710). If it is the first host 204 of the host list being evaluated (block 712), the first host 204 of the host list becomes the reference host for a number of iterations of blocks 704, 708, 710, 712, and 716 to evaluate with network topologies of the other hosts 204 of the physical rack 206. When the first host 204 of the host list is detected at block 712, the network connection validator 254 sets the reference network_topology parameter to the current network topology of the currently selected host 204 (e.g., a "host_topology") (block 714). After setting the reference network_topology parameter at block 714, or if the network connection validator 254 determines at block 712 that the currently selected host 204 is not the first host 204 being processed in the host list of the physical rack 206, control advances to block 716. At block 716, the network connection validator 254 determines whether the combination of a current host_topology of a currently selected host 204 and a reference network_topology of a reference host 204 is valid. For example, the network connection validator 254 can evaluate the combination based on one or more network topology validation rules stored in the network topology rules store 264 of FIG. 2.

When the network connection validator 254 detects a valid combination of network topologies at block 716, control returns to block 704. When the network connection validator 254 determines at block 704 that there are no more hosts 204 in the host list of the physical rack 206 to evaluate, the network connection validator 254 generates and returns a "valid_topology" value (block 706) to a calling process or function such as the process(es) of FIG. 5, and the example process of FIG. 7 ends. The "valid_topology" value indicates that all the network topologies of the hosts 204 of the physical rack 206 are valid for concurrent implementation in the physical rack 206.

Returning to block 716, when the network connection validator 254 determines that a combination of a current host_topology of a currently selected host 204 and a reference network topology of a reference host 204 is not valid, the network connection validator 254 generates and returns an "invalid_topology" value (block 718) to a calling process or function such as the process(es) of FIG. 5, and the example process of FIG. 7 ends. The "invalid_topology" value indicates that a combination of two network topologies of two corresponding hosts 204 of the physical rack 206 are invalid for concurrent implementation in the physical rack 206.

FIG. 8 is example pseudocode 800 representative of example machine-readable instructions that may be executed to implement the VIA 202 of FIG. 2 to validate network topologies of the hosts 204 of the physical rack 206 of FIG. 2. The machine-readable instructions of the pseudocode 800 are represented by the flowchart of FIG. 7. In the illustrated example of FIG. 7, example network topology validation rules as "compatible_sets" of network topologies 802. The example "compatible_sets" of network topologies 702 indicate compatible sets (1, 6), (2, 7), (3, 8), (4, 9), and (5, 10). The example "compatible_sets" of network topologies 802 may be obtained as network topology validation rules from the network topology rules store 264 of FIG. 2.

Example compatible set (1, 6) specifies that network topology 1 (e.g., single-switch, double-link network topology 402a of FIG. 4) and network topology 6 (e.g., single-switch, quadruple-link network topology 402f of FIG. 4) are valid for concurrent implementation in the physical rack 206. Example compatible set (2, 7) specifies that network topology 2 (e.g., single-switch, double-link LAG network topology 402b of FIG. 4) and network topology 7 (e.g., single-switch, quadruple-link LAG network topology 402g of FIG. 4) are valid for concurrent implementation in the physical rack 206. Example compatible set (3, 8) specifies that network topology 3 (e.g., double-switch, double-link network topology 402c of FIG. 4) and network topology 8 (e.g., double-switch, multi-link, double-LAG network topology 402h of FIG. 4) are valid for concurrent implementation in the physical rack 206. Example compatible set (4, 9) specifies that network topology 4 (e.g., double-switch, double-link with peer-link VPC connectivity network topology 402d of FIG. 4) and network topology 9 (e.g., double-switch, multi-link, double-LAG with peer-link VPC connectivity network topology 402i of FIG. 4) are valid for concurrent implementation in the physical rack 206. Example compatible set (5, 10) specifies that network topology 5 (e.g., double-switch, double-link with peer-link connectivity 402e of FIG. 4) and network topology 10 (e.g., double-switch, multi-link double-LAG with peer-link connectivity network topology 402j of FIG. 4) are valid for concurrent implementation in the physical rack 206.

FIG. 9 is example pseudocode 900 representative of example machine-readable instructions that may be executed to implement the VIA 202 of FIG. 2 to configure physical and virtual networks for the hosts 204 of the physical rack 206 of FIG. 2. For example, machine-readable instructions represented by pseudocode 902 to configure virtual network configuration settings in a host 204 are represented by block 514 of FIG. 5. In addition, example machine-readable instructions represented by pseudocode 904 to configure physical network configuration settings in a ToR switch 210 are represented by block 516 of FIG. 5.

Figure 10:
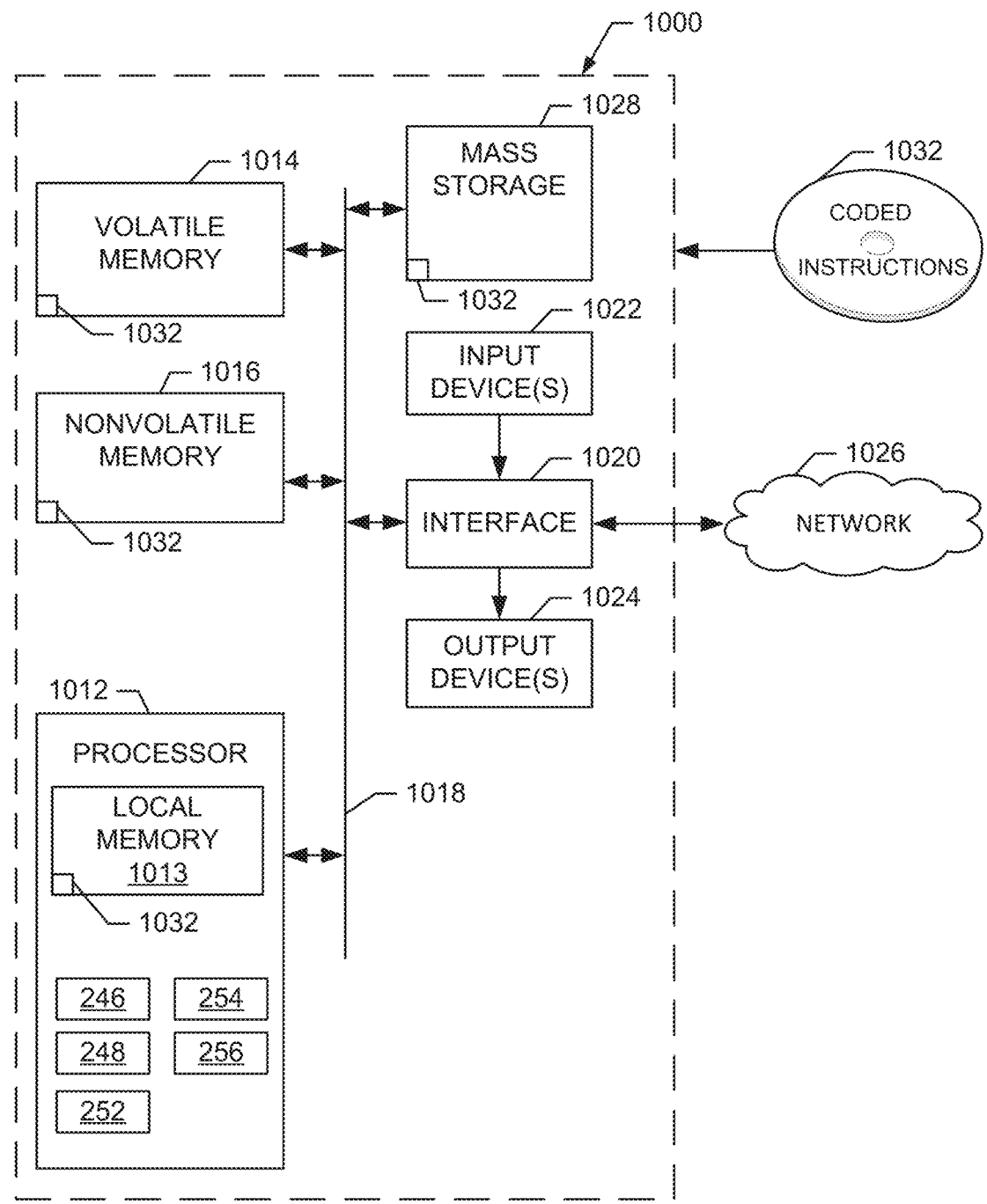
FIG. 10 is a block diagram of an example processor platform structured to execute the machine-readable instructions represented in FIGS. 5-9 to implement the VIA of FIG. 2 to generate and validate network topologies of the physical server hosts of the physical rack of FIG. 2 and to configure physical and virtual networks for the hosts.

FIG. 10 is a block diagram of an example processor platform 1000 structured to execute the machine-readable instructions represented in FIGS. 5-9 to implement the VIA 202 of FIG. 2 to generate and validate network topologies of the hosts 204 of the physical rack 206 of FIG. 2 and to configure physical and virtual networks for the hosts 204. The processor platform 1000 can be, for example, a server, a personal computer, a workstation, a self-learning machine (e.g., a neural network), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example prober 246, the example network interface 248, the example network topology generator 252, the example network connection validator 254, and the example network configurator 256.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

Example machine executable-instructions 1032 represented by the flowcharts of FIGS. 5-7 and/or the pseudocode of FIGS. 8 and 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed to autonomously identify network topologies of hosts of physical racks and configure virtual and physical network configuration settings for such network topologies. Examples disclosed herein simplify technical aspects of configuring and deploying physical server racks. For example, because less user involvement is required, fewer errors are made during configurations of virtual and physical networks, different types of network topologies can be used in combinations that are valid, and the virtual and physical networks of the physical rack can be performed significantly faster than using prior techniques. In addition, examples disclosed herein improve the scalability of physical rack configuration and deployment by autonomously detecting physical network configuration information, generating network topologies, validating the network topologies, and configuring virtual and physical network configurations of the physical rack based on such validated network topologies. For example, to deploy a large data center, hundreds of physical racks can be configured and deployed faster than prior techniques by decreasing user involvement and, thus, user error by using machine-executed network topology rules-based analyses to generate and analyze network topologies of hosts.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload may be deployed to any of the virtualization environments. Examples disclosed herein may be implemented in any one or more of the multiple different virtualization environments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to determine network topologies, the apparatus comprising:
   memory;
   instructions; and
   programmable circuitry, the instructions to cause the programmable circuitry to at least:
   cause transmission of a probe message on a first bundle of network interface cards connected to a peer switch;
   access a data store including rules corresponding to a first network topology, a second network topology, and a third network topology;
   after a probe response is received on a second bundle of network interface cards based on the probe message, determine that a network topology of a host is the first network topology based on a determination of whether a link aggregation group (LAG) is enabled on the first bundle of network interface cards; and
   when the probe response is not received on the second bundle of network interface cards based on the probe message:
   determine that the network topology of the host is the second network topology based on whether the LAG is enabled on the first bundle of network interface cards; or
   determine that the network topology of the host is the third network topology based on a quantity of network interface cards in the host.

2. The apparatus as defined in claim 1, wherein the programmable circuitry is to cause the transmission of the probe message after a determination that multiple peer switches are connected to the host.

3. The apparatus as defined in claim 1, wherein the programmable circuitry is to determine the first network topology as a double-switch, multi-link, double-LAG with peer-link connectivity network topology when the LAG is enabled on the first bundle of network interface cards.

4. The apparatus as defined in claim 1, wherein the programmable circuitry is to determine the first network topology as a double-switch, double-link with peer-link connectivity when the LAG is not enabled on the first bundle of network interface cards.

5. The apparatus as defined in claim 1, wherein the programmable circuitry is to determine the second network topology as a double-switch, multi-link, double-LAG network topology when the LAG is enabled on the first bundle of network interface cards.

6. The apparatus as defined in claim 1, wherein the programmable circuitry is to determine the second network topology as a double-switch, double-link network topology when the LAG is not enabled on the first bundle of network interface cards.

7. The apparatus as defined in claim 1, wherein the programmable circuitry is to determine the third network topology as one of: (a) a double-switch, double-link with peer-link virtual port channel (VPC) connectivity network topology or (b) a double-switch, multi-link, double-LAG with peer-link VPC connectivity network topology.

8. The apparatus as defined in claim 1, wherein the programmable circuitry is to determine the second network topology when link aggregation control protocol (LACP) packets are from more than one source media access control (MAC) address.

9. The apparatus as defined in claim 1, wherein the programmable circuitry is to determine the third network topology when link aggregation control protocol (LACP) packets are not from more than one source media access control (MAC) address.

10. A non-transitory computer readable storage medium comprising machine executable instructions to cause programmable circuitry to at least:

access a data store including rules corresponding to a first network topology, a second network topology, and a third network topology;

cause transmission of a probe message on a first bundle of network interface cards connected to a peer switch;

after a probe response is received on a second bundle of network interface cards based on the probe message, determine that a network topology of a host is the first network topology based on a determination of whether a link aggregation group (LAG) is enabled on the first bundle of network interface cards; and when the probe response is not received on the second bundle of network interface cards based on the probe message:

determine that the network topology of the host is the second network topology based on whether the LAG is enabled on the first bundle of network interface cards; or determine that the network topology of the host is the third network topology based on a quantity of network interface cards in the host.

11. The computer readable storage medium as defined in claim 10, wherein the instructions are to cause the programmable circuitry to cause the transmission of the probe message after a determination that multiple peer switches are connected to the host.

12. The computer readable storage medium as defined in claim 10, wherein the instructions are to cause the programmable circuitry to determine the first network topology as a double-switch, multi-link, double-LAG with peer-link connectivity network topology when the LAG is enabled on the first bundle of network interface cards.

13. The computer readable storage medium as defined in claim 10, wherein the instructions are to cause the programmable circuitry to determine the first network topology as a double-switch, double-link with peer-link connectivity when the LAG is not enabled on the first bundle of network interface cards.

14. The computer readable storage medium as defined in claim 10, wherein the instructions are to cause the programmable circuitry to determine the second network topology as a double-switch, multi-link, double-LAG network topology when the LAG is enabled on the first bundle of network interface cards.

15. The computer readable storage medium as defined in claim 10, wherein the instructions are to cause the programmable circuitry to determine the second network topology as a double-switch, double-link network topology when the LAG is not enabled on the first bundle of network interface cards.

16. The computer readable storage medium as defined in claim 10, wherein the instructions are to cause the programmable circuitry to determine the third network topology as one of: (a) a double-switch, double-link with peer-link virtual port channel (VPC) connectivity network topology or (b) a double-switch, multi-link, double-LAG with peer-link VPC connectivity network topology.

17. The computer readable storage medium as defined in claim 10, wherein the instructions are to cause the programmable circuitry to determine the second network topology when link aggregation control protocol (LACP) packets are from more than one source media access control (MAC) address.

18. The computer readable storage medium as defined in claim 10, wherein the instructions are to cause the programmable circuitry to determine the third network topology when link aggregation control protocol (LACP) packets are not from more than one source media access control (MAC) address.

19. A method to determine network topologies, the method comprising:

accessing a data store including rules corresponding to a first network topology, a second network topology, and a third network topology;

sending a probe message on a first bundle of network interface cards connected to a peer switch;

after a probe response is received on a second bundle of network interface cards based on the probe message, determining that a network topology of a host is the first network topology based on a determination of whether a link aggregation group (LAG) is enabled on the first bundle of network interface cards; and when the probe response is not received on the second bundle of network interface cards based on the probe message:

determining that the network topology of the host is the second network topology based on whether the LAG is enabled on the first bundle of network interface cards; or determining that the network topology of the host is the third network topology based on a quantity of network interface cards in the host.

20. The method as defined in claim 19, wherein the sending of the probe message is after a determination that multiple peer switches are connected to the host.

21. The method as defined in claim 19, wherein the determining that the network topology of the host is the first network topology includes determining the first network topology as a double-switch, multi-link, double-LAG with peer-link connectivity network topology when the LAG is enabled on the first bundle of network interface cards.

22. The method as defined in claim 19, wherein the determining that the network topology of the host is the first network topology includes determining the first network topology as a double-switch, double-link with peer-link connectivity when the LAG is not enabled on the first bundle of network interface cards.

23. The method as defined in claim 19, wherein the determining that the network topology of the host is the second network topology includes determining the second network topology as a double-switch, multi-link, double-LAG network topology when the LAG is enabled on the first bundle of network interface cards.

24. The method as defined in claim 19, wherein the determining that the network topology of the host is the second network topology includes determining the second network topology as a double-switch, double-link network topology when the LAG is not enabled on the first bundle of network interface cards.

25. The method as defined in claim 19, wherein the determining that the network topology of the host is the third network topology includes determining the third network topology as one of: (a) a double-switch, double-link with peer-link virtual port channel (VPC) connectivity network topology or (b) a double-switch, multi-link, double-LAG with peer-link VPC connectivity network topology.

26. The method as defined in claim 19, wherein the determining that the network topology of the host is the second network topology includes determining the second network topology when link aggregation control protocol (LACP) packets are from more than one source media access control (MAC) address.

27. The method as defined in claim 19, wherein the determining that the network topology of the host is the third network topology includes determining the third network topology when link aggregation control protocol (LACP) packets are not from more than one source media access control (MAC) address.

\* \* \* \* \*